(12) United States Patent
Yun et al.

(10) Patent No.: US 12,410,322 B2
(45) Date of Patent: Sep. 9, 2025

(54) ANTIBACTERIAL POLYMER COMPOSITION

(71) Applicant: LG Chem, Ltd., Seoul (KR)

(72) Inventors: Haesung Yun, Daejeon (KR); Hyungsam Choi, Daejeon (KR); Seonjung Jung, Daejeon (KR); Ji Seok Lee, Daejeon (KR)

(73) Assignee: LG Chem, Ltd., Seoul (KR)

( * ) Notice: Subject to any disclaimer, the term of this patent is extended or adjusted under 35 U.S.C. 154(b) by 645 days.

(21) Appl. No.: 17/789,943

(22) PCT Filed: May 28, 2021

(86) PCT No.: PCT/KR2021/006693
§ 371 (c)(1),
(2) Date: Jun. 29, 2022

(87) PCT Pub. No.: WO2021/242052
PCT Pub. Date: Dec. 2, 2021

(65) Prior Publication Data
US 2023/0092376 A1 Mar. 23, 2023

(30) Foreign Application Priority Data
May 28, 2020 (KR) .................. 10-2020-0064475
May 28, 2021 (KR) .................. 10-2021-0069014

(51) Int. Cl.
C09D 5/14 (2006.01)
C09D 7/65 (2018.01)
C09D 129/04 (2006.01)

(52) U.S. Cl.
CPC ................ C09D 5/14 (2013.01); C09D 7/65 (2018.01); C09D 129/04 (2013.01)

(58) Field of Classification Search
CPC .......... C09D 5/14; C09D 7/65; C09D 129/04; C09D 7/20; C09D 7/63; C09D 171/02;
(Continued)

(56) References Cited

U.S. PATENT DOCUMENTS

2007/0104766 A1   5/2007   Wang et al.
2010/0081729 A1   4/2010   Collin et al.
(Continued)

FOREIGN PATENT DOCUMENTS

CN   101351163 A   1/2009
CN   101665659 A   3/2010
(Continued)

OTHER PUBLICATIONS

Gerasin, et al, Guanidine-containing organomineral complexes as biocide additives to polymeric composites, Russian Journal of Applied Chemistry, vol. 91 No. 8 2018, 8 pages (Year: 2018).*
(Continued)

Primary Examiner — Alicia Bland
(74) Attorney, Agent, or Firm — Lerner David LLP

(57) ABSTRACT

The present disclosure relates to an antibacterial polymer composition, more specifically, to an antibacterial polymer composition enabling preparation of a coating layer exhibiting excellent antibacterial property. The antibacterial polymer composition may use a polymer including a specific number of repeat units as an antibacterial agent. Accordingly, unlike coating compositions using antibacterial monomers/antibacterial oligomers, elution of an antibacterial agent from the coating layer may be prevented even after time passes, and thus, it can continuously exhibit antibacterial property, and yet, is difficult to be absorbed in human body.

19 Claims, 1 Drawing Sheet

(58) Field of Classification Search
CPC .... C09D 201/00; C08F 120/60; C08F 220/58; C08F 220/60; Y02A 50/30; C08L 33/24
See application file for complete search history.

(56) References Cited

U.S. PATENT DOCUMENTS

| | | |
|---|---|---|
| 2014/0155482 A1 | 6/2014 | Rossett |
| 2019/0174749 A1 | 6/2019 | Yeung et al. |
| 2021/0130625 A1 | 5/2021 | Kim et al. |
| 2021/0322330 A1 | 10/2021 | Shi et al. |
| 2022/0346379 A1 | 11/2022 | Yun et al. |

FOREIGN PATENT DOCUMENTS

| | | | |
|---|---|---|---|
| CN | 107936799 A | 4/2018 | |
| CN | 109414016 A | 3/2019 | |
| CN | 109569331 A | 4/2019 | |
| CN | 110067042 A | 7/2019 | |
| CN | 111073492 A | 4/2020 | |
| CN | 111154370 A | 5/2020 | |
| CN | 111481679 A | 8/2020 | |
| CN | 112358571 A * | 2/2021 | ............ C08F 220/60 |
| CN | 113088154 A | 7/2021 | |
| JP | 2000053873 A * | 2/2000 | |
| JP | 3111216 B2 | 11/2000 | |
| JP | 2019206509 A | 12/2019 | |
| KR | 20040039219 A | 5/2004 | |
| KR | 100601393 B1 | 7/2006 | |
| KR | 101893446 B1 | 8/2018 | |
| KR | 20190044971 A | 5/2019 | |
| KR | 20200009394 A | 1/2020 | |
| RU | 2669563 C2 | 10/2018 | |
| WO | 2018131549 A1 | 7/2018 | |
| WO | 2021096230 A1 | 5/2021 | |

OTHER PUBLICATIONS

English translation of CN 112358571A (Year: 2021).*
English translation of JP 2000053873A (Year: 2000).*

M. R. Menyashev et al: "Guanidine methacrylate and methacryloyl guanidine hydrochloride: Synthesis and polymerization", Polymer Science. Series B, vol. 58, No. 5, Oct. 20, 2016 (Oct. 20, 2016), pp. 556-563.

Menyashev M. R. et al: "Features of Reactions of Radical (Co)Polymerization of Methacryloylguanidine Trifluoroacetate in Various Solvents", Polymer Science, Series B, vol. 59, No. 6, Nov. 1, 2017 (Nov. 1, 2017), pp. 650-654.

Isupova Zalina Y. et al: "Investigation of Complex Compounds of Guanidine Acrylate With Magnesium Ions", Izvestia Vyssih Ucebnyh Zavedenij. Himia I Himiceskaa Technologia, vol. 60, No. 5, Jan. 1, 2017 (Jan. 1, 2017), pp. 63-67.

Gerasin V A et al: "Guanidine-Containing Organomineral Complexes as Biocide Additives to Polymeric Composites", Russian Journal of Applied Chemistry, Pleiades Publishing, Moscow, vol. 91, No. 8, Nov. 8, 2018 (Nov. 8, 2018), pp. 1297-1304.

Extended European Search Report for Application No. 21813081.3 dated Jan. 5, 2023. 11 pgs.

Zhang, Hao, et al., "Synthesis of novel guanidine-based ABA triblock copolymers and their antimicrobial honeycomb films", The Royal Society of Chemistry, Polym. Chem., Jun. 2018, 9, 3922-3930.

Sivov, N.A., Menyashev, M.R., Gerasin, V.A. et al. "Copolymerization of Methacryloylguanidine Trifluoroacetate with Styrene in Acetone and Dimethylsulfoxide at High Conversions". Polym. Sci. Ser. B 61, 28-31 (Apr. 2019).

Bai, Shan et al. "Antifogging/Antibacterial Coatings Constructed by N-Hydroxyethylacrylamide and Quaternary Ammonium-Containing Copolymers." ACS applied materials & interfaces vol. 12,10 (Feb. 2020): 12305-12316. 39 pgs.

International Search Report for PCT/KR2021/006693 dated Sep. 10, 2021. 3pgs.

Locock, K.E.S. et al., "Guanylated Polymethacrylates: A Class of Potent Antimicrobial Polymers with Low Hemolytic Activity," Biomacromolecules, Oct. 7, 2013, pp. 4021-4031, American Chemical Society.

* cited by examiner

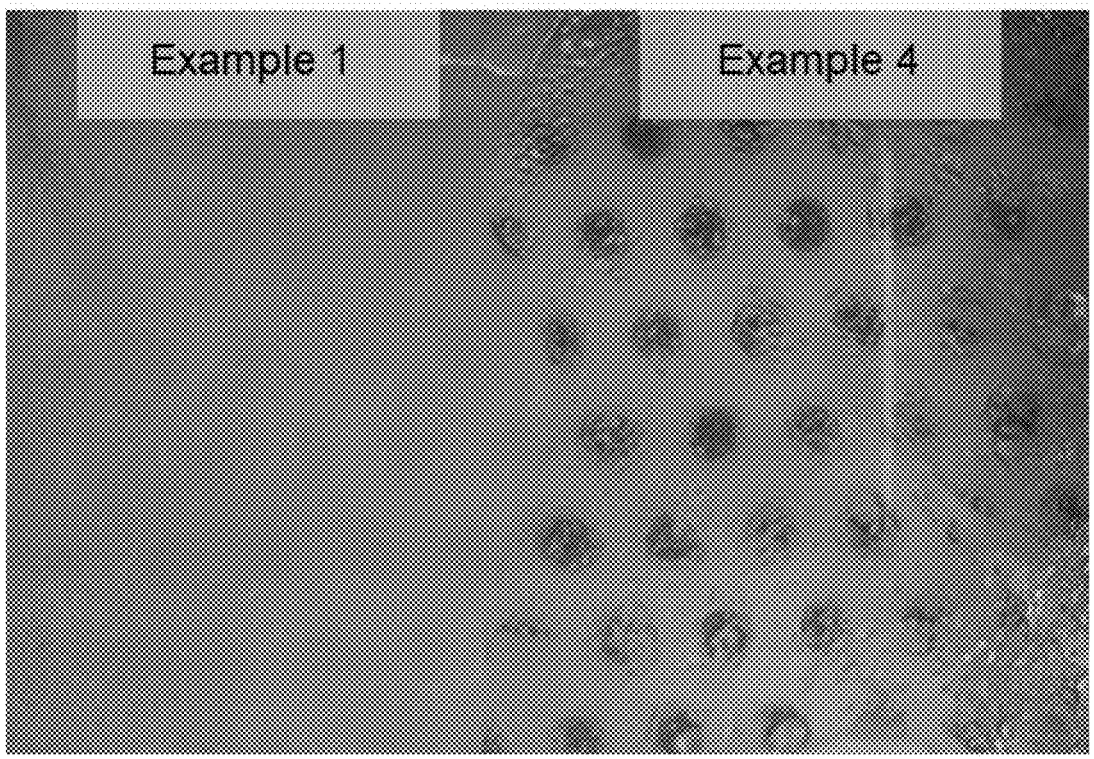

ANTIBACTERIAL POLYMER COMPOSITION

CROSS-REFERENCE TO RELATED APPLICATION(S)

This application is a national phase entry under 35 U.S.C. § 371 of International Application No. PCT/KR2021/006693, filed on May 28, 2021, which claims priority to Korean Patent Application No. 10-2020-0064475, filed on May 28, 2020, and Korean Patent Application No. 10-2021-0069014, filed on May 28, 2021, the disclosures of which are herein incorporated by reference in their entirety.

TECHNICAL FIELD

The present disclosure relates to an antibacterial polymer composition.

BACKGROUND OF ART

Recently, with diversification of life, improvement in the standard of living, and change and improvement of consciousness, interest is growing in the enhancement of hygiene and comfortability in individual living environment. Thus, studies are progressed on microorganisms threatening the same, but there are a lot of kinds of microorganisms existing in everyday life environment, and they are widely distributed in nature, and thus, the damage is serious.

Particularly, microorganisms such as bacteria, fungus, and the like may inhabit in various environments such as dietary life, residential environment, clothes, industrial goods, and the like, wherein bacteria may cause various kinds of inflammations or food poisoning, and fungus may not only generate odor, but also cause various skin diseases, respiratory diseases, allergy, atopic dermatitis, and the like. And, microorganisms inhabiting on the surface of electronic products and daily necessities may cause deterioration of the product performance.

Thus, in order to prevent damage to human by such microorganisms, various antibacterial materials for inhibiting the growth of microorganisms or killing microorganisms are being developed.

Specifically, previously developed antibacterial materials may be largely classified into inorganic antibacterial agents and organic antibacterial agents. The inorganic antibacterial agent contains metal such as silver or copper, and although it has excellent thermal stability and can maintain antibacterial property even under high temperature condition, it is expensive, and after processing, there is a possibility of discoloration due to the metal ions included. And, although the organic antibacterial agent is inexpensive compared to the inorganic bacterial agent and exhibits excellent antibacterial effect even in a small amount, there is a possibility of elution after application to a product, and thus, antibacterial property maintenance is not good.

Moreover, although the organic antibacterial agent can secure product stability in terms of inhibition of propagation of microorganisms and killing, it simultaneously has toxicity, and thus, may cause irritation to the skin of the user.

Thus, there is a demand for an antibacterial coating composition that may be easily coated on various products, and yet, maintain antibacterial property without elution after coating, and wherein coating layer may be easily removed as necessary.

DETAILED DESCRIPTION OF THE INVENTION

Technical Problem

It is an object of the invention to provide an antibacterial polymer composition with excellent bacterial growth inhibition effect.

It is another object of the invention to provide an antibacterial product having a coating layer formed by the antibacterial polymer composition.

Technical Solution

In order to achieve the object, according to the present disclosure, there is provided an antibacterial polymer composition comprising:
hydrophilic polymer; and
antibacterial polymer comprising repeat units represented by the following Chemical Formula 1,
wherein the antibacterial polymer is included in the content of 1 part by weight or more and less than 50 parts by weight, based on 100 parts by weight of the hydrophilic polymer:

[Chemical Formula 1]

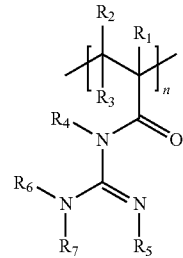

in the Chemical Formula 1,
$R_1$ to $R_3$ are each independently, hydrogen or methyl,
$R_4$ to $R_7$ are each independently, hydrogen, C1 to 10 alkyl, or C6 to 30 aryl, and
n is an integer of 10 to 10,000.

According to the present disclosure, there is also provided an antibacterial product comprising one or more substrates; and a coating layer equipped on at least one side of the substrate, wherein the coating layer is formed by the above antibacterial polymer composition.

Advantageous Effects

The antibacterial polymer composition according to the present disclosure can enable preparation of a coating layer exhibiting excellent bacterial growth inhibition effect.

BRIEF DESCRIPTION OF THE DRAWINGS

FIG. 1 is a photograph comparing the results of Antifogging test for two glass plates respectively coated with the antibacterial polymer composition prepared in Example 1 and the antibacterial polymer composition prepared in Example 4.

DETAILED DESCRIPTION OF THE EMBODIMENTS

As used herein, terms "a first", "a second" and the like are used to explain various constructional elements, and they are used only to distinguish one constructional element from other constructional elements.

And, the terms used herein are only to explain specific embodiments, and are not intended to limit the present disclosure. A singular expression includes a plural expression thereof, unless it is expressly stated or obvious from the context that such is not intended. As used herein, the terms "comprise", "equipped" or "have", etc. are intended to designate the existence of practiced characteristic, number, step, constructional element or combinations thereof, and they are not intended to preclude the possibility of existence or addition of one or more other characteristics, numbers, steps, constructional elements or combinations thereof.

And, in case it is stated that each layer or element is formed "on" or "above" each layers or elements, it means that each layer or element is formed right above each layer or element, or that other layers or elements may be additionally formed between the layers or on the object or substrate.

Although various modifications can be made to the present disclosure and the present disclosure may have various forms, specific examples will be illustrated and explained in detail below. However, it should be understood that these are not intended to limit the present disclosure to specific disclosure, and that the present disclosure includes all the modifications, equivalents or replacements thereof without departing from the spirit and technical scope of the present disclosure.

And, technical terms used herein are only for mentioning specific embodiments, and they are not intended to limit the present disclosure. And, a singular expression includes a plural expression thereof, unless it is expressly stated or obvious from the context that such is not intended.

Meanwhile, the term "(meth)acrylate" used herein includes both acrylate and methacrylate.

And, "C1 to 10 alkyl" is the generic term of C1 to 10 linear, branched or cyclic alkyl groups. Specifically, the C1 to 10 alkyl group may be a C1 to 10 linear alkyl group; a C1 to 5 linear alkyl group; or a C3 to 10 branched or cyclic alkyl group. As specific examples, methyl, ethyl, propyl, n-propyl, isopropyl, butyl, n-butyl, isobutyl, tert-butyl, sec-butyl, 1-methyl-butyl, 1-ethyl-butyl, pentyl, n-pentyl, isopentyl, neopentyl, tert-pentyl, hexyl, n-hexyl, 1-methylpentyl, 2-methylpentyl, 4-methyl-2-pentyl, 3,3-dimethylbutyl, 2-ethylbutyl, heptyl, n-heptyl, cyclopentylmethyl, cyclohexylmethyl, octyl, n-octyl, tert-octyl, 1-methylheptyl, 2-ethylhexyl, 2-propylpentyl, n-nonyl, 2,2-dimethylheptyl, 1-ethyl-propyl, 1,1-dimethyl-propyl, isohexyl, 1-methylhexyl, 2-methylhexyl, 3-methylhexyl, 4-methylhexyl, 5-methylhexyl, and the like may be mentioned, but not limited thereto.

And, "C6 to 30 aryl" may be monocyclic or polycyclic aryl groups. Specifically, it may be a C6 to 15 monocyclic aryl group; or a C10 to 30 polycyclic aryl group. As specific examples of the monocyclic aryl group, a phenyl group, a biphenyl group, a terphenyl group, and the like may be mentioned, but not limited thereto. And, as specific examples of the polycyclic aryl group, a naphthyl group, an anthryl group, a phenanthryl group, a pyrenyl group, a perylenyl group, a chrysenyl group, a fluorenyl group, and the like may be mentioned, but not limited thereto.

In general, in order for life chemical products used in ordinary living spaces such as home, office, publicly used facilities, and the like to exhibit antibacterial properties, the surface of such life chemical product is coated with an antibacterial agent capable of restraining the propagation of microorganisms and/or killing microorganisms such as bacteria. Wherein, the antibacterial agent included in the antibacterial coating may damage the cell membranes or cell walls of the microorganisms, or induce denaturation of their proteins, thereby inhibiting the growth of microorganism, and restraining the propagation of microorganisms and/or killing microorganisms.

However, confirmed bacteria exceeds 5,000 kinds, and they may be classified into Gram-positive bacteria and Gram-negative bacteria according to cell wall layer, and may be classified into aerobes, facultative anaerobes, anaerobes according to the degree of oxygen requirement. Moreover, the shape of bacterial cell is various such as spheroid, rod, spiral, and the like. Thus, commonly, it is not easy for one kind of antibacterial agent to have physical/chemical mechanism capable of damaging the cell membranes/cell walls of various bacteria or denaturing their proteins, and thus, studies for developing antibacterial agents capable of exhibiting excellent antibacterial properties against specific kinds of bacteria are being progressed.

Particularly, bacteria that can be confirmed by being turned red if dyed with Gram's stain are Gram-negative bacteria, and as examples thereof, *Proteus mirabilis, Escherichia coli, Salmonella typhi, Pseudomonas aeruginosa, Vibrio cholerae,* and the like may be mentioned, and such Gram-negative bacteria may cause secondary infection such as urinary trac infection and respiratory tract-related pneumonia. The cell wall of such Gram-negative bacterial has relatively thin peptidoglycan compared to that of Gram-positive bacteria, but instead, it has an outer membrane consisting of lipopolysaccharide, lipoprotein and other complicated polymer materials. Thus, in order to exhibit antibacterial property against Gram-negative bacteria, it is required to develop antibacterial agents capable of effectively denaturing or destroying the outer membrane, namely cell membrane, instead of cell wall.

And, in case an antibacterial agent used for antibacterial coating is eluted over time, or the user is continuously exposed to an antibacterial agent, it may threaten user's health to the contrary.

Thus, the inventors of the present disclosure confirmed that in case an antibacterial coating layer is formed on the surface of a life chemical product using an aqueous polymer coating composition in which a specific content of antibacterial polymer comprising repeat units of a specific structure and hydrophilic polymer are dissolved, the antibacterial coating layer formed may induce destruction of a cell membrane by electrostatic interaction with the cell membrane of Gram-negative bacteria, thereby inhibiting the propagation of Gram-negative bacteria and killing it.

Particularly, since the polymer composition according to one embodiment uses polymer comprising repeat units over the specific number as an antibacterial agent, unlike coating compositions using antibacterial monomers/antibacterial oligomers, elution of the antibacterial agent from a coating layer may be prevented even after time passes, and thus, it can continuously exhibit antibacterial property, and yet, is difficult to be absorbed in human body, thus free from the user's safety problem.

And, the antibacterial polymer composition comprises a specific amount of hydrophilic polymer, thus exhibiting workability such that it can be easily coated on various kinds and shapes of articles, and it is environmentally friendly because an organic solvent is not used.

Hereinafter, an antibacterial polymer composition and antibacterial product according to specific embodiments of the invention will be explained in more detail.

Antibacterial Polymer Composition

The antibacterial polymer composition of one embodiment comprises hydrophilic polymer; and antibacterial polymer comprising repeat units represented by the following Chemical Formula 1, wherein the antibacterial polymer is included in the content of 1 part by weight or more and less than 50 parts by weight, based on 100 parts by weight of the hydrophilic polymer.

[Chemical Formula 1]

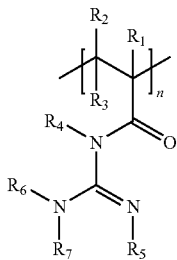

in the Chemical Formula 1, $R_1$ to $R_3$ are each independently, hydrogen or methyl, $R_4$ to $R_7$ are each independently, hydrogen, C1 to 10 alkyl, or C6 to 30 aryl, and n is an integer of 10 to 10,000.

And, the antibacterial polymer composition may further comprise a solvent comprising water.

First, the hydrophilic polymer is the generic term of polymers that can be dissolved in water, and in case the antibacterial polymer composition comprises the hydrophilic polymer, due to the hydrophilic groups included in the hydrophilic polymer, for example, hydroxy groups (—OH), thixotropy suitable for coating a coating composition may be provided.

And, since the hydrophilic polymer is easily dissolved in water, it may have excellent compatibility with antibacterial polymer comprising repeat units represented by the Chemical Formula 1. And, hydrogen bonds between the hydrophilic groups included in the hydrophilic polymer, for example, hydroxy groups (—OH), and the nitrogen atoms or oxygen atoms in the antibacterial polymer may be formed. Thereby, the antibacterial polymer may be prevented from being eluted from the antibacterial coating layer formed by the coating composition.

Wherein, in case other polymers are used instead of hydrophilic polymer, an organic solvent is inevitably used for coating, thus exposing the user to the organic solvent, but since the antibacterial polymer composition of the present disclosure uses water as base, it is environmentally friendly. And, since hydrophilic antibacterial polymer is easily dissolved by water even after the coating composition is dried, after completing antibacterial action, if necessary, the coating layer formed may be easily separated from the substrate.

The hydrophilic polymer may be one or more selected from polyvinyl alcohol (PVA), polyethyleneglycol (PEG), polyvinylpyrrolidone (PVP) and carboxymethyl cellulose (CMC). Particularly, polyvinyl alcohol (PVA) may be used as the hydrophilic polymer because it has excellent solubility in water and is easy to use, and a coating layer formed after drying a coating composition properly maintains the shape of a film, but the hydrophilic polymer is not limited thereto.

And, it is preferable that the hydrophilic polymer has weight average molecular weight (Mw) of 100,000 to 500,000 g/mol. If the molecular weight of the polymer exceeds the above range, it may not be easily dissolved in water, thus rendering preparation of a coating solution difficult, and if the molecular weight is low, sufficient viscosity may not be formed, thus rendering coating difficult. For example, the weight average molecular weight (Mw, g/mol) of the hydrophilic polymer may be 100,000 or more, 150,000 or more, 180,000 or more, or 200,000 or more, and 500,000 or less, 400,000 or less, 300,000 or less, or 250,000 or less. Wherein the weight average molecular weight of the hydrophilic polymer may be measured by the same method as for antibacterial polymer described later.

Such hydrophilic polymer may be included in the content of 7 wt % to 20 wt %, based on the total weight of the antibacterial polymer composition. If the content of the hydrophilic polymer is too low, sufficient viscosity may not be formed, and thus, the coating solution may not be coated, and if the content of the hydrophilic polymer is too high, the viscosity of the polymer may rapidly increase and flowability of the solution may decrease, thus rendering application of the coating solution difficult. Specifically, the hydrophilic polymer may be included in the content of 7 wt % or more, 8 wt % or more, 9 wt % or more, or 10 wt % or more, and 20 wt % or less, 19 wt % or less, 18 wt % or less, 17 wt % or less, 16 wt % or less, 15 wt % or less, 14 wt % or less, 13 wt % or less, or 12 wt % or less, based on the total weight of the antibacterial polymer composition.

Meanwhile, the antibacterial polymer comprises repeat units represented by the Chemical Formula 1. Particularly, the antibacterial polymer comprises a structure derived from guanidine, thus forming electrostatic interaction with the phospholipid bilayer cell membrane of Gram-negative bacteria. During this process, proteins of Gram-negative bacteria are denatured, thus inducing destruction of the cell membrane, and thus, the growth speed of Gram-negative bacteria may become slow. Thereby, excellent antibacterial effect may be exhibited against common bacteria having phospholipid bilayer, namely Gram-negative bacteria, and in case bacteria generates secondary odor, deodorization effect may be also exhibited.

Particularly, the antibacterial polymer is included in the antibacterial polymer composition, in the content of 1 part by weight or more and less than 50 parts by weight, based on 100 parts by weight of the hydrophilic polymer. If the antibacterial polymer is included in an amount less than 1 part by weight based on 100 parts by weight of the hydrophilic polymer, it may be difficult to exhibit sufficient antibacterial and deodorization effects, and if the antibacterial polymer is included in an amount greater than 50 parts by weight based on 100 parts by weight of the hydrophilic polymer, it may be dangerous to normal cells of user, as well as to microorganisms generating odorous components, and thus, it is not suitable in terms of human body safety, and the viscosity of a composition may increase, and thus, it may be difficult to coat on a substrate to a uniform thickness. Specifically, the antibacterial polymer may be included in the antibacterial polymer composition, in the content of 1 part by weight or more, 1.5 parts by weight or more, or 2 parts by weight or more, and less than 50 parts by weight, 40 parts by weight or less, 30 parts by weight or less, 25 parts by weight or less, 20 parts by weight or less, or 10 parts by weight or less, based on 100 parts by weight of the hydrophilic polymer.

And, the number of repeat units represented by the Chemical Formula 1, included in the antibacterial polymer, should be at least 10, namely, n meaning the number of the repeat units should be 10 or more, and maximum 10,000, namely, n is 10,000 or less. If n is less than 10, the compound may be in the form of antibacterial monomer or oligomer instead of antibacterial polymer, and thus, may be easily eluted in a coating layer formed after drying, and if n is greater than 10,000, the viscosity of a coating solution may significantly increase, and thus, it cannot be coated. Specifically, n may be 10 or more, 50 or more, 100 or more, 120 or more, 150 or more, 200 or more, 300 or more, or 443 or more, and 5,000 or less, 3,000 or less, 2,000 or less, 1,500 or less, 1,000 or less, or 500 or less.

And, in the Chemical Formula 1,
all $R_1$ to $R_3$ may be hydrogen,
$R_4$ to $R_7$ may be each independently, hydrogen, methyl or phenyl.
Wherein, $R_4$ to $R_7$ may be identical to each other.

For example, the repeat unit represented by the Chemical Formula 1 may be represented by the following Chemical Formula 1-1:

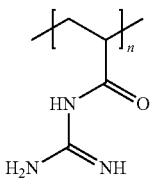

[Chemical Formula 1-1]

in the Chemical Formula 1-1,
n is an integer of 10 to 10,000.

Wherein, the repeat unit represented by the Chemical Formula 1 may be derived from a monomer compound represented by the following Chemical Formula 1':

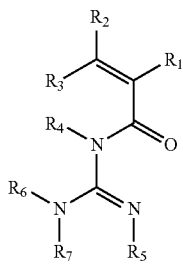

[Chemical Formula 1']

In the Chemical Formula 1',
each substituent is as defined in the Chemical Formula 1.

Meanwhile, the antibacterial polymer may be homopolymer comprising the repeat units represented by the Chemical Formula 1 only, copolymer comprising the repeat units represented by the Chemical Formula 1 and repeat units derived from monomers having one or more ethylenically unsaturated groups, or a mixture thereof.

Wherein, the monomers having one or more ethylenically unsaturated groups may be one or more selected from acrylic acid-based monomers, alkyl (meth)acrylate-based monomers, acrylamide-based monomers, halogenated vinyl monomers, vinyl alkylate-based monomers, alkenyl cyanide monomers, and aromatic vinyl-based monomers.

The acrylic acid-based monomer may be acrylic acid or methacrylic acid.

And, the alkyl (meth)acrylate-based monomer may be methyl acrylate, ethyl acrylate, propyl acrylate, isopropyl acrylate, n-butyl acrylate, isobutyl acrylate, n-amyl acrylate, isoamyl acrylate, n-ethylhexyl acrylate, 2-ethylhexyl acrylate, methyl methacrylate, ethyl methacrylate, propyl methacrylate, isopropyl methacrylate, n-butyl methacrylate, isobutyl methacrylate, n-amyl methacrylate, isoamyl methacrylate, n-hexyl methacrylate, n-ethylhexyl methacrylate, 2-ethylhexyl methacrylate, lauryl acrylate, cetyl acrylate, stearyl acrylate, lauryl methacrylate, cetyl methacrylate, or steary methacrylate, and preferably, methyl methacrylate.

And, the acryl amide-based monomer may be (meth)acrylamide, N-isopropylacrylamide, N-hydroxymethyl (meth)acrylamide, N-(2-hydroxyethyl)(meth)acrylamide, N-(3-hydroxypropyl)(meth)acrylate, N-(4-hydroxybutyl)(meth)acrylamide, N-(5-hydroxypentyl)(meth)acrylamide, N-(6-hydroxyhexyl)(meth)acrylamide, N-(7-hydroxyheptyl)(meth)acrylamide, or N-(8-hydroxyoctyl)(meth)acrylamide.

And, the halogenated vinyl monomer may be vinyl chloride, vinyl bromide, vinylidene chloride, or tetrafluoroethylene.

And, the vinyl alkylate-based monomer may be vinyl alkylate ($CH_2CH$—$OC(O)R$, wherein R is C1 to 10 alkyl) such as vinyl acetate, vinyl pyrrolidone, vinyl carbazole, or vinyl alkyl ether ($CH_2CH$—$OR$, wherein R is C1 to 10 alkyl).

And, the alkenyl cyanide monomer is a monomer comprising both ethylenically unsaturated group and nitrile group in the molecule, and for example, acrylonitrile, methacrylonitrile, allylcyanide, and the like may be mentioned.

And, the aromatic vinyl-based monomer may be styrene, α-methylstyrene, β-methylstyrene, p-t-butylstyrene, chlorostyrene, vinyl benzoate, methyl vinyl benzoate, vinyl naphthalene, chloromethyl styrene, hydroxymethyl styrene, or divinylbenzene, and preferably, styrene.

According to one embodiment, the repeat unit derived from monomers having one or more ethylenically unsaturated groups may be represented by the following Chemical Formula 2 or 3.

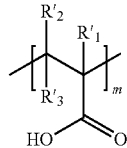

[Chemical Formula 2]

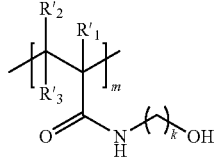

[Chemical Formula 3]

in the Chemical Formulas 2 and 3,
$R'_1$ to $R'_3$ are each independently, hydrogen or methyl,
k is an integer of 1 to 10, and
m is an integer of 1 to 10,000.

In the Chemical Formula 2, m which means the number of repeat units represented by the Chemical Formula 2 or 3, may be 1 or more, more specifically, 1 to 2,000. Within the above range, the functional group of the Chemical Formula 2, a carboxyl group (—COOH) may effectively form hydrogen bond with hydroxy group (—OH) existing in the hydrophilic polymer, thereby further preventing elution of antibacterial polymer. For example, m may be 10 or more, 100 or more, 500 or more, or 1,000 or more, and 5,000 or less, 2,000 or less, 1,800 or less, 1,500 or less, or 1,200 or less.

For example, the repeat unit represented by the Chemical Formula 2 or 3 may be represented by the following Chemical Formula 2-1, Chemical Formula 3-1, or Chemical Formula 3-2:

[Chemical Formula 2-1]

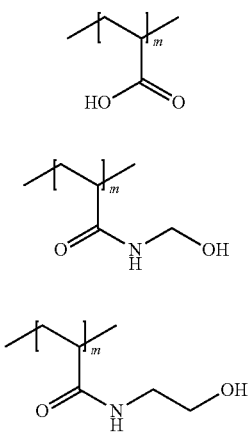

[Chemical Formula 3-1]

[Chemical Formula 3-2]

In the Chemical Formula 2-1, Chemical Formula 3-1 and Chemical Formula 3-2,
m is an integer of 1 to 10,000.

Wherein, the repeat unit represented by the Chemical Formula 2 may be derived from a monomer compound represented by the following Chemical Formula 2'.

[Chemical Formula 2']

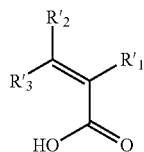

In the Chemical Formula 2',
each substituent is as defined in the Chemical Formula 2.
And, the repeat unit represented by the Chemical Formula 3 may be derived from a monomer compound represented by the following Chemical Formula 3'.

[Chemical Formula 3']

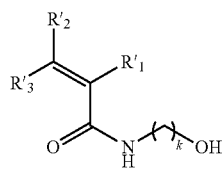

In the Chemical Formula 3',
each substituent is as defined in the Chemical Formula 3.

Thus, the antibacterial polymer according to one embodiment may be homopolymer comprising the repeat units represented by the Chemical Formula 1 only, copolymer comprising the repeat units represented by the Chemical Formula 1 and the repeat units represented by the Chemical Formula 2, or a mixture thereof.

More specifically, in case the antibacterial polymer is homopolymer, the polymer may be linear polymer in which only the repeat units represented by the following Chemical Formula 1-1 are continuously connected, wherein the end of the polymer is a guanidinyl group, namely,

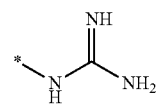

(wherein, * means a bonding position to neighboring atom):

[Chemical Formula 1-1]

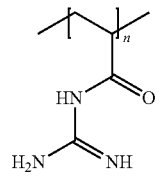

In the Chemical Formula 1-1,
n is an integer of 10 to 10,000.

Specifically, the linear polymer in which the repeat units represented by the Chemical Formula 1-1 are continuously connected may be prepared by polymerization of guanidine acrylate (GA) represented by the following Chemical Formula 1″, and during the polymerization, an end capping agent is not introduced, and thus, the end of the polymer may become a guanidinyl group.

[Chemical Formula 1″]

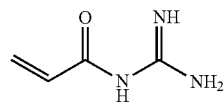

As such, in case polymer having a guanidinyl group at the end is used as antibacterial polymer, the antibacterial property of the antibacterial polymer composition may be further improved.

And, in case the antibacterial polymer is copolymer or comprises copolymer, the copolymer may have a structure in which the repeat units represented by the Chemical Formula 1 and repeat units derived from monomer having one or more ethylenically unsaturated groups are linearly connected, and the antibacterial polymer may be block copolymer in which blocks of the repeat units are connected by covalent bond, or random copolymer in which the repeat units are randomly arranged.

For example, in case the antibacterial polymer is copolymer or comprises copolymer, the copolymer may be represented by the following Chemical Formula 4 or 5.

[Chemical Formula 4]

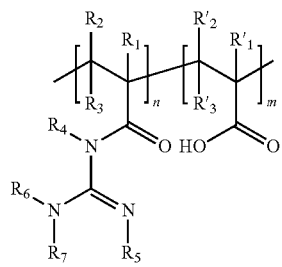

In the Chemical Formula 4, each substituent is as defined in the Chemical Formulas 1 and 2,

[Chemical Formula 5]

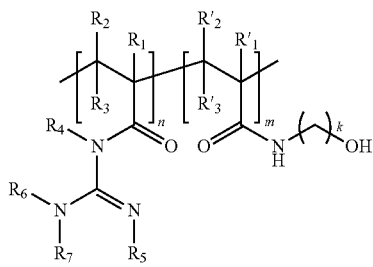

In the Chemical Formula 5, each substituent is as defined in the Chemical Formulas 1 and 3.

And, in case the antibacterial polymer is the above explained copolymer, or comprises the above explained copolymer, the mole ratio of the repeat units represented by the Chemical Formula 1 and the repeat units derived from monomers having one or more ethylenically unsaturated groups may be 1:99 to 99:1. Specifically, in case the antibacterial polymer is copolymer represented by the Chemical Formula 4 or 5, or comprises the same, the mole ratio (n:m) of (the repeat units represented by the Chemical Formula 1) and (the repeat units represented by the Chemical Formula 2 or 3) in the copolymer may be 1:99 to 99:1. More specifically, the n:m may be 1:10 or more, 5:95 or more, 10:90 or more, or 50:50 or more, and 95:5 or less, or 91:9 or less.

The mole ratio of the repeat unis represented by the Chemical Formula 1 and the repeat units represented by the Chemical Formula 2 or 3 may be controlled by controlling the reaction mole ratio of the monomers represented by the Chemical Formula 1' and/or monomers represented by the Chemical Formula 2' or Chemical Formula 3'.

More specifically, in case the antibacterial polymer is copolymer, the polymer may be linear block or random polymer represented by the following Chemical Formula 4-1, wherein the end of the polymer is guanidinyl group or carboxyl group.

[Chemical Formula 4-1]

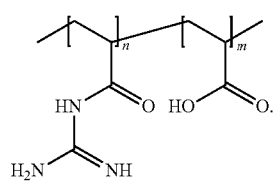

In the Chemical Formula 4-1, n+m is 10 to 10,000, and n:m is 1:99 to 99:1.

More specifically, in case the antibacterial polymer is copolymer, the polymer may be a linear block or random polymer represented by the following Chemical Formula 5-1, wherein the end of the polymer is guanidinyl group or N-hydroxymethylacrylamide group.

[Chemical Formula 5-1]

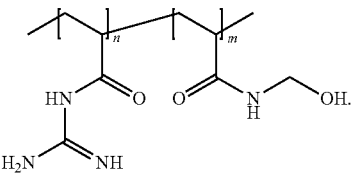

In the Chemical Formula 5-1, n+m is 10 to 10,000, and n:m is 1:99 to 99:1.

For example, in the Chemical Formulas 4-1 and 5-1, n may be 50 or more, 100 or more, or 120 or more, and 2,000 or less, 1,500 or less, or 1,000 or less, or 500 or less, and m may be 10 or more, 100 or more, 200 or more, or 500 or more, and 2,000 or less, 1,800 or less, 1,500 or less, or 1,200 or less. And, n:m may be 1:10 or more, 5:95 or more, 10:90 or more, or 50:50 or more, and 95:5 or less, or 91:9 or less.

Wherein, in case the antibacterial polymer is copolymer or comprises copolymer, the copolymer may be prepared by copolymerization of each monomer, and during the polymerization, an end capping agent is not introduced, and thereby, the end of the polymer may include guanidinyl group.

And, the antibacterial polymer may be linear polymer. Specifically, it may have one-dimensional linear polymer structure in which the above explained repeat units are arranged in a long chain. It is distinguished from network polymer having three-dimensional network structure in which the repeat units are connected by a crosslinking agent separately added. In case antibacterial polymer having such linear polymer structure is used, the molecular weight of the polymer may be easily controlled, and the viscosity of the antibacterial polymer may be easily controlled.

And, the antibacterial polymer may have weight average molecular weight (Mw) of 5,000 to 1,000,000 g/mol. If the weight average molecular weight of the antibacterial polymer is less than 5,000 g/mol, it may exist in the form of monomer instead of polymer, and thus, may be easily eluted, and due to low molecular weight, it may be absorbed into human body, and if the weight average molecular weight of the antibacterial polymer is greater than 1,000,000 g/mol, due to large molecular weight, viscosity may increase, and thus, it cannot be coated or cannot be dissolved in water. More preferably, the weight average molecular weight of the antibacterial polymer may be 5,000 or more, 8,000 or more, 10,000 or more, 15,000 or more, 20,000 or more, 30,000 or more, 40,000 or more, 50,000 or more, or 100,000 or more, and 500,000 or less, 400,000 or less, 300,000 or less, 200,000 or less 150,000 or less, or 115,000 or less.

Wherein, the weight average molecular weight (Mw) of the antibacterial polymer may be measured using gel permeation chromatography (GPC) using polystyrene (PS) as a calibration standard sample. More specifically, 200 mg of antibacterial polymer is diluted in 200 ml of N,N-dimethylformamide solvent to prepare about 1000 ppm of a sample, and then, using Agilent 1200 series GPC device, the weight average molecular weight can be measured through RI detector at the flow of 1 ml/min. Wherein, a calibration curve is drawn using 8 kinds of PS standards, and then, the molecular weight of a sample can be calculated based thereon.

Meanwhile, the solvent included in the antibacterial polymer composition comprises water. More specifically, the solvent may further comprise ethanol, acetone, or isopropyl alcohol. For example, the solvent included in the antibacterial polymer composition may be water, or a mixture of water and ethanol.

Wherein, the solvent may be used in an amount of volume (ml/g) corresponding to 4 to 13 times of the weight of the hydrophilic polymer. In case such an amount of a solvent is used, a composition suitable for coating can be realized.

And, the antibacterial polymer composition may further comprise 1 to 10 part by weight of glycerol, based on 100 parts by weight of the hydrophilic polymer. Wherein, glycerol is a compound having 3 hydroxy groups in the molecule, and it may be included in the antibacterial polymer composition to improve flexibility of a film formed after drying a coating solution. Specifically, the antibacterial polymer composition may further comprise glycerol in an amount of 1 part by weight or more, 2 parts by weight or more, 3 parts by weight or more, or 4 parts by weight or more, and 10 parts by weight or less, 9 parts by weight or less, 8 parts by weight or less, 7 parts by weight or less, or 6 parts by weight or less, based on 100 parts by weight of the hydrophilic polymer.

And, the antibacterial polymer composition may have a solid content of 10 to 20 wt %. Wherein, the "solid content" means components excepting volatile components in the composition. Thus, the solid content existing in the antibacterial polymer composition means the total weight of the antibacterial polymer composition minus the content of volatile components solvents, and in case the antibacterial polymer composition comprises only hydrophilic polymer and antibacterial polymer except solvents, the solid content means the sum of hydrophilic polymer and antibacterial polymer. Wherein, in case the solid content of the antibacterial polymer composition is too low, viscosity of a solution may be too low, and thus, it may flow together with water, and it cannot be coated, and if the content of solid content is too high, viscosity of a coating solution may increase, and thus, the solution cannot be coated. More specifically, the solid content of the antibacterial polymer composition may be 10 wt % or more, or 10.2 wt % or more, or 11 wt % or more, and 18 wt % or less, 16 wt % or less, 15 wt % or less, or 12 wt % or less.

And, the viscosity of the antibacterial polymer composition under constant temperature/constant humidity (23° C., 50% relative humidity), measured at 200 rpm in V-75 spindle using Brookfield DV2T LV TJ0 equipment, may be 1,000 cP to 20,000 cP. Within the above viscosity range, workability may be secured to the extent that the composition may be easily applied on a substrate to be coated, and simultaneously, the solvent may be easily removed. More specifically, the viscosity of the antibacterial polymer composition, when measured by the above explained method, may be 1,000 cP or more, 1,100 cP or more, 1,200 cP or more, 1,211 cP or more, 2,020 cP or more or 3,340 cP or more, and 20,000 cP or less, or 18,000 cP or less, or 15,000 cP or less, 12,000 cP or less, or 10,000 cP or less, 8,000 cP or less, 6,000 cP or less, 5,000 cP or less, 4,318 cP or less, 4,000 cP or less, or 3,884 cP or less.

Meanwhile, the antibacterial polymer composition according to one embodiment is prepared by
dissolving hydrophilic polymer; based on 100 parts by weight of the hydrophilic polymer, 1 part by weight or more and less than 50 parts by weight of antibacterial polymer; and optionally, based on 100 parts by weight of the hydrophilic polymer, 1 to 10 parts by weight of glycerol, in a solvent comprising water in an amount (ml/g) of volume corresponding to 4 to 13 times of the weight of the hydrophilic polymer, such that the final solid content may become 10 to 20 w %.

Wherein, the process of dissolving each component in the solvent may be conducted by stirring at a temperature of about 45° C. to 60° C. for 60 minutes to 4 hours, using commonly known stirrer.

And, the antibacterial polymer composition may exhibit antibacterial property to Gram-negative bacteria. The Gram-negative bacteria may be one or more selected from *Proteus mirabilis, Escherichia coli, Salmonella typhi, Pseudomonas aeruginosa*, and *Vibrio cholerae*. Specifically, the antibacterial polymer composition may exhibit antibacterial property to *Proteus mirabilis* that generates secondary odor through the production of ammonia. Wherein, the description 'antibacterial polymer composition exhibits antibacterial property' means that a coating layer formed by coating of the antibacterial polymer composition on a substrate, followed by drying, namely, formed by removal of solvents in the coating composition, exhibits antibacterial property.

Wherein, *Proteus mirabilis* is Gram negative bacillus, facultative anaerobe or aerobe, and is distributed in various environments, and respiratory tract or skin of human and animals may be infected therewith to cause urinary system-related diseases. Particularly, it is known that in case human is infected with *Proteus mirabilis*, urinary tract infection or acute pyelonephritis is caused. And, *Proteus mirabilis* may alkalize urine to discharge ammonia, thereby inducing odor.

Specifically, the antibacterial property of the antibacterial polymer composition against *Proteus mirabilis* may be evaluated using absorbance, and the *Proteus mirabilis* bacterial growth inhibition rate of the antibacterial polymer composition, calculated by the following Mathematical Formula 1, may be 70% or more, 72% or more, 80% or more, 84% or more, 90% or more, 92% or more, 95% or more, 96% or more, or 98% or more.

[Mathematical Formula 1]
$$\text{bacterial growth inhibition rate (\%)} = \left(1 - \frac{A_S}{A_0}\right) \times 100$$

In the Formula, $A_s$ denotes the absorbance of experimental group at the wavelength of 600 nm, namely the absorbance of *Proteus mirabilis* culture fluid in which a sample is introduced, and $A_0$ denotes the absorbance of control at the wavelength of 600 nm, namely the absorbance of *Proteus mirabilis* pure culture fluid in which a sample is not introduced.

Thus, the antibacterial polymer composition according to one embodiment i) simultaneously comprises hydrophilic polymer and antibacterial polymer of a specific structure, wherein ii) the composition comprises the antibacterial polymer in a specific content based on the hydrophilic polymer, and iii) the composition comprises a specific content of solid content, and thus, it can be easily coated on a substrate to a uniform thickness, and thereby, exhibits excellent antibacterial activity against bacteria such as Gram-negative bacteria, and yet, maintains such antibacterial activity even after a long time passes, and is suitable in terms of human body safety.

The antibacterial polymer composition is aqueous, and thus, can be usefully used for antibacterial and sterilization purpose in various fields such as foods, pharmaceuticals, agricultural pesticides and daily supplies, and the like.

Specifically, the antibacterial polymer composition may be used in combination with other liquid compositions, and for example, the antibacterial polymer composition may be mixed with compositions for specific uses, such as indoor/outdoor paint compositions, floor finishing compositions, agricultural compositions, detergents for cleaning, laundry detergents, or anti-fogging solutions, and the like, and exhibit antibacterial property.

And, the antibacterial polymer composition may additionally exhibit anti-fogging function, anti-reflection function, self-cleaning function, infrared cut off function, anti-sweating function, and the like, besides antibacterial property.

Specifically, in case the antibacterial polymer included in the antibacterial polymer composition is copolymer or comprises copolymer, the kind of repeat units additionally included in addition to the repeat units represented by the Chemical Formula 1 may be modified to provide additionally required functions besides antibacterial property.

For example, in case the antibacterial polymer comprises repat units represented by the Chemical Formula 3 in addition to the repeat units represented by the Chemical Formula 1, it may exhibit anti-fogging function by acrylamide group, besides antibacterial property.

Antibacterial Product

Meanwhile, according to another aspect, there is provided an antibacterial product comprising one or more substrates; and a coating layer equipped on at least one side of the substrate, wherein the coating layer is formed by the above explained antibacterial polymer composition.

The substrate may be a polymer film such as polyethylene (PE), polypropylene (PP), polystyrene (PS), polyimide (PA), polyimide (PI), polyethyleneterephthalate (PET), polyvinylchloride (PVC), and the like; fabric; glass; plastic foam such as urethane foam, styrofoam, and the like; solid wood; plywood; metal substrate, but is not limited thereto.

And, the antibacterial product may be various life chemical products, medical supplies, automobile parts, building materials, and the like requiring antibacterial properties, and the kind is not limited.

Specifically, the antibacterial product may be one or more selected from materials for maintaining freshness, fabric products, agricultural films, office supplies, packaging materials, and medical supplies.

For example, it may be packaging materials such as food packaging material, vegetable packaging material, grain packaging material, fruit packaging material, meat packaging material, marine product packaging material, processed food packaging material, and the like; material for maintaining freshness such as containers of vegetable, grain, fruit, meat, marine products, processed food, and the like; food tray mat; fabric products such as table mat, table cross, carpet, seat cover, and the like; agricultural films; mask; office supplies such as tape, adhesive tape, masking tape, masking films, and the like; various packaging materials such as flower packaging material, plastic envelope, easy open packaging envelope, shopping bag, standing bag, transparent packaging box, autopackaging film, electronic part packaging material, machine part packaging material, and the like; medical supplies such as medical film, medical tape, cell culture pack, and the like.

And, the coating layer may be formed with a thickness of, for example, 10 μm or more, 20 μm or more, 50 μm or more, 80 μm or more, 100 μm or more, or 150 μm or more, and 1 mm or less, 800 μm or less, 600 μm or less, 500 μm or less, 300 μm or less, 250 μm or less, or 200 μm or less, and such a coating layer may be formed by applying the antibacterial polymer composition on at least one side of the substrate, and then, drying it at a temperature of 40° C. to 80° C. for 60 minutes to 240 minutes, thereby coating a thin film.

And, the coating layer can be separated from the substrate, if necessary. More specifically, the coating layer may maintain the shape of a film after drying is completed. Thus, in case a PET film, and the like treated with a release agent is used as a substrate, the coating can be separated from the substrate because the hydrophilic polymer of the antibacterial polymer composition maintains the shape of a film.

Hereinafter, the actions and effects of the invention will be explained in detail through specific examples. However, these examples are presented only as illustrations of the invention, and the scope of right of the invention is not determined thereby.

PREPARATION EXAMPLE 1

Preparation of Antibacterial Polymer PGA

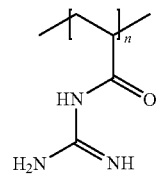

To 100 parts by weight of water, 10 parts by weight of guanidine acrylate was added, sodium persulfate was introduced in an amount of 2 mol % based on guanidine acrylate, and the solution was stirred. The reaction was progressed at 70° C. for 6 hours so that polymerization may be sufficiently progressed, and after the reaction was completed, the solution was precipitated and vacuum dried to obtain solid polymer PGA of the above structure.

Wherein, prepared polymer PGA was homopolymer consisting of the above described repeat units, wherein the end is guanidinyl group, and the weight average molecular weight of the homopolymer was 50,000 g/mol, wherein n was 443. Wherein, the weight average molecular weight of the polymer was measured by dissolving the polymer in DMF, using GPC (Agilent 1200 series GPC).

PREPARATION EXAMPLE 2

Preparation of Antibacterial Polymer PAA-co-PGA

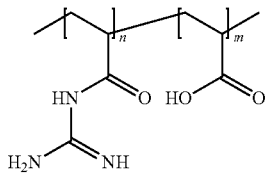

To 100 parts by weight of water, 10 parts by weight of acrylic acid and guanidine acrylate were introduced at the mole ratio of 10:1, and then, antibacterial polymer PAA-co-PGA having the above structure was prepared by the same method as Preparation Example 1. Wherein, prepared polymer PAA-co-PGA was copolymer consisting of the above described repeat units, wherein guanidinyl group and carboxyl group are randomly positioned at the end, and the weight average molecular weight of the copolymer was 100,000 g/mol, wherein n was 120, and m was 1,200.

Wherein, the weight average molecular weight of the polymer was measured by dissolving the polymer in DMF, using GPC (Agilent 1200 series GPC).

PREPARATION EXAMPLE 3

Preparation of Antibacterial Polymer PHMA-co-PGA

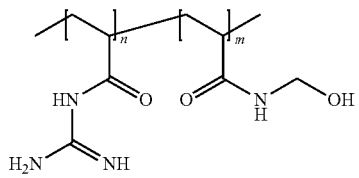

To 100 parts by weight of water, 50 parts by weight of N-hydroxymethylacrylamide and guanidine acrylate were introduced at the mole ratio of 1:1, and then, sodium persulfate was introduced in an amount of 2 mol % based on guanidine acrylate, and the solution was stirred. The reaction was progressed at 80° C. for 6 hours so that polymerization may be sufficiently progressed, and after the reaction was completed, the solution was precipitated and vacuum dried to obtain solid polymer PHMA-co-PGA of the above structure.

Antibacterial polymer PHMA-co-PGA with the above structure was prepared by the same method as Preparation Example 1. Wherein, prepared polymer PHMA-co-PGA was copolymer consisting of the above described repeat units, wherein guanidinyl group and carboxyl group are randomly positioned at the end, and the weight average molecular weight of the copolymer was 115,000 g/mol, wherein n was 500, and m was 500. Wherein, the weight average molecular weight of the polymer was measured by dissolving the polymer in DMF, using GPC (Agilent 1200 series GPC).

EXAMPLE 1

Preparation of Antibacterial Polymer Composition

As hydrophilic polymer, 100 parts by weight of polyvinyl alcohol (PVA, weight average molecular weight (Mw): 200,000 g/mol) manufactured by Sigma-Aldrich corporation, and as antibacterial polymer, based on 100 parts by weight of the hydrophilic polymer, 2 parts by weight of PGA prepared in Preparation Example 1, were introduced in 60° C. water of the content controlled such that the final solid content became 10.2 wt %, and they were mixed for 6 hours using magnetic stirrer (Hei-Tec, manufactured by heidolph-instruments) so that the polymers were sufficiently dissolved, thus preparing an antibacterial polymer composition. The viscosity of the prepared composition under constant temperature/constant humidity (23° C., 50% relative humidity), when measured at 200 rpm in V-75 spindle using Brookfield DV2T LV TJ0, was 1,211 cP.

EXAMPLE 2

Preparation of Antibacterial Polymer Composition

An antibacterial polymer composition was prepared by the same method as Example 1, except that the antibacterial polymer PGA was used in an amount of 10 parts by weight, based on 100 parts by weight of the hydrophilic polymer PVA, and the content of water was controlled such that the final solid content became 11 wt %.

The viscosity of the prepared composition under constant temperature/constant humidity (23° C., 50% relative humidity), when measured at 200 rpm in V-75 spindle using Brookfield DV2T LV TJ0, was 2,020 cP.

EXAMPLE 3

Preparation of Antibacterial Polymer Composition

An antibacterial polymer composition (solid content: 11 wt %) was prepared by the same method as Example 2, except that PAA-co-PGA prepared in Preparation Example 2 was used in an amount of 10 parts by weight, based on 100 parts by weight of the hydrophilic polymer PVA, instead of the antibacterial polymer PGA in Example 2.

The viscosity of the prepared composition under constant temperature/constant humidity (23° C., 50% relative humidity), when measured at 200 rpm in V-75 spindle using Brookfield DV2T LV TJ0, was 3,340 cP.

EXAMPLE 4

Preparation of Antibacterial Polymer Composition

As hydrophilic polymer, 100 parts by weight of polyvinyl alcohol (PVA, weight average molecular weight (Mw): 200,000 g/mol) manufactured by Sigma-Aldrich corporation, and as antibacterial polymer, based on 100 parts by weight of the hydrophilic polymer, 10 parts by weight of PHMA-co-PGA prepared in Preparation Example 3, were introduced in 60° C. water of the content controlled such that the final solid content became 11 wt %, and they were mixed for 6 hours using magnetic stirrer (Hei-Tec, manufactured by heidolph-instruments) so that the polymers were sufficiently dissolved, thus preparing an antibacterial polymer composition. The viscosity of the prepared composition under constant temperature/constant humidity (23° C., 50% relative humidity), when measured at 200 rpm in V-75 spindle using Brookfield DV2T LV TJ0, was 3,884 cP.

EXAMPLE 5

Preparation of Antibacterial Polymer Composition

As hydrophilic polymer, 100 parts by weight of polyvinyl alcohol (PVA, weight average molecular weight (Mw): 200,000 g/mol) manufactured by Sigma-Aldrich corporation, and as antibacterial polymer, based on 100 parts by weight of the hydrophilic polymer, 10 parts by weight of PGA prepared in Preparation Example 1 and 10 parts by weight of PAA-co-PGA prepared in Preparation Example 2, were introduced in 60° C. water of the content controlled such that the final solid content became 12 wt %, and they were mixed for 6 hours using magnetic stirrer (Hei-Tec, manufactured by heidolph-instruments) so that the polymers were sufficiently dissolved, thus preparing an antibacterial polymer composition. The viscosity of the prepared composition under constant temperature/constant humidity (23° C., 50% relative humidity), when measured at 200 rpm in V-75 spindle using Brookfield DV2T LV TJ0, was 4,318 cP.

COMPARATIVE EXAMPLE 1

Preparation of Polymer Coating Composition

A polymer coating composition (solid content: 10 wt %) was prepared by the same method as Example 1, except that the antibacterial polymer PGA of Example 1 was not used.

The viscosity of the prepared composition under constant temperature/constant humidity (23° C., 50% relative humidity), when measured at 200 rpm in V-75 spindle using Brookfield DV2T LV TJ0, was 1,134 cP.

COMPARATIVE EXAMPLE 2

Preparation of Polymer Coating Composition

A polymer coating composition was prepared by the same method as Example 1, except that the antibacterial polymer PGA of Example 1 was not used, and that the content of water was controlled such that the final solid content became 20 wt %.

The viscosity of the prepared composition under constant temperature/constant humidity (23° C., 50% relative humidity), when measured at 200 rpm in V-75 spindle using Brookfield DV2T LV TJ0, was 35,920 cP.

COMPARATIVE EXAMPLE 3

Preparation of Polymer Coating Composition

A polymer coating composition was prepared by the same method as Example 1, except that the antibacterial polymer PGA of Example 1 was used in the content of 50 parts by weight, based on 100 parts by weight of PVA, but the content of water was controlled such that the final solid content became 10.2 wt % as in Example 1.

The viscosity of the prepared composition under constant temperature/constant humidity (23° C., 50% relative humidity), when measured at 200 rpm in V-75 spindle using Brookfield DV2T LV TJ0, was 247 cP.

COMPARATIVE EXAMPLE 4

Preparation of Polymer Coating Composition

First, low molecular weight antibacterial polymer LM-PGA, which is homopolymer (n is 9, weight average molecular weight: 1,000 g/mol), was prepared by the same method as Preparation Example 1.

An antibacterial polymer composition (solid content: 10.2 wt %) was prepared by the same method as Example 1, except that the above prepared low molecular weight antibacterial polymer LM-PGA was used instead of the antibacterial polymer PGA of Example 1.

The viscosity of the prepared composition under constant temperature/constant humidity (23° C., 50% relative humidity), when measured at 200 rpm in V-75 spindle using Brookfield DV2T LV TJ0, was 1,136 cP.

EXPERIMENTAL EXAMPLE

Evaluation of Antibacterial Property (1) Preparation of Antibacterial Film

Unless otherwise noted, the following property evaluation was progressed at constant temperature/constant humidity (23±1° C., relative humidity 50±10%).

Each polymer coating composition prepared in Examples and Comparative Examples was applied on a PET film (thickness: 75m, product name: R3100N, manufactured by SKC corporation) substrate treated with a silicone release agent, using Bar coater, such that the thickness became 200 μm, and then, it was dried at 80° C. for 240 minutes to prepare each antibacterial film in which a coating layer is formed on one side of the substrate.

However, the polymer coating compositions of Comparative Examples 2 and 3 could not be coated on the substrate, and thus, bacterial growth inhibition rate and the number of bacteria could not be measured.

(2) Antibacterial Test

For each antibacterial film prepared above, antibacterial test was progressed. Specifically, as antibacterial test, bacterial growth inhibition rate (%) was measured as follows, and the number of bacteria was confirmed using the antibacterial evaluation method of JIS Z 2801.

Into 25 ml of Nutrient broth culture media inoculated with test bacteria Proteus Mirabilis (ATCC 29906) at 3300 CFU/ml, 0.1 g of the above prepared antibacterial film, which was appropriately cut with scissors disinfected with alcohol, was introduced, and then, cultured in a shaking incubator (VS-37SIF, manufactured by Vision Tech) at 37° C. for 16 hours. The absorbance of the cultured solution at the wavelength of 600 nm was measured using UV-Vis Spectrophotometer (manufactured by Optizen POP, K Lab). And, in pure culture media in which the antibacterial film was not introduced, Proteus Mirabilis (ATCC 29906) was cultured at 37° C. for 16 hours to prepare a cultured solution as control, and the absorbance at 600 nm was measured by the same method. Using the measurement results, Proteus Mirabilis (ATCC 29906) bacteria growth inhibition rate (%) was calculated according to the following Mathematical Formula 1, and the results were shown in the following Table 1.

[Mathematical Formula 1]
$$\text{bacterial growth inhibition rate (\%)} = \left(1 - \frac{A_S}{A_0}\right) \times 100$$

In the Formula, $A_S$ denotes the absorbance of experimental group at the wavelength of 600 nm, namely the absorbance of Proteus mirabilis culture fluid in which a sample is introduced, and $A_0$ denotes the absorbance of control at the wavelength of 600 nm, namely the absorbance of Proteus mirabilis pure culture fluid in which a sample is not introduced.

And, each antibacterial film prepared above was cut to a size of 5 cm×5 cm, and then, test was progressed according to the antibacterial evaluation method of JIS Z 2801. Specifically, bacteria cultured for 24 hours was sequentially diluted and spread on solid Agar culture media, and through the community appeared, the number of bacteria was confirmed, and the results were shown in the following Table 1.

TABLE 1

| | | Example 1 | Example 2 | Example 3 | Example 4 | Example 5 | Comparative Example 1 | Comparative Example 2 | Comparative Example 3 |
|---|---|---|---|---|---|---|---|---|---|
| Hydrophilic polymer | Kind | PVA | PVA | PVA | PVA | PVA | PVA | PVA | PVA |
| | content[1] | 10 | 10 | 10 | 10 | 10 | 10 | 20 | 6.8 |
| Antibacterial polymer | Kind | PGA | PGA | PAA-co-PGA | PHMA-co-PGA | PGA/PAA-co-PGA | — | — | PGA |
| | cotent[2] | 2 | 10 | 10 | 10 | 10/10 | — | — | 50 |
| Solid content(wt%) | | 10.2 | 11 | 11 | 11 | 12 | 10 | 20 | 10.2 |
| Viscosity of composition (cP) | | 1,211 | 2,020 | 3,340 | 3,884 | 4,318 | 1,134 | 35,920 | 247 |
| Bacterial growth inhibition rate[3] (%) | | 72 | 92 | 84 | 98 | 96 | 0 | Not measurable | Not measurable |
| Number of bacteria[4] (CFU/ml) | | $6.2 \times 10^3$ | $2.3 \times 10^2$ | $3.7 \times 10^3$ | $1.1 \times 10^3$ | $1.5 \times 10^2$ | | | $1.2 \times 10^5$ |

[1] wt % based on the total weight of the composition
[2] parts by weight, based on 100 parts by weight of hydrophilic polymer PVA
[3] bacterial growth inhibition rate confirmed by absorbance measurement method
[4] number of bacteria confirmed by antibacterial evaluation method of JIS Z 2801

Referring to Table 1, it can be seen that in case antibacterial films are prepared using the antibacterial polymer compositions of Examples, unlike the antibacterial films of Comparative Examples 1 and 2 that do not comprise antibacterial polymer, the compositions can be easily coated on a substrate to a uniform thickness, and the coating layers formed exhibit excellent bacterial growth inhibition rate of 70% or more, 72% or more, 80% or more, 84% or more, 90% or more, 92% or more, 95% or more, or 98% or more.

And, in the case of the antibacterial film of Comparative Example 3 prepared using a composition comprising antibacterial polymer over the specific content based on hydrophilic polymer, the composition could not be uniformly coated on a substrate, and thus, bacterial growth inhibition rate and the number of bacteria could not be measured. It is judged that although the composition of Comparative Example 3 has identical solid content to the composition of Example 1, since the content of antibacterial polymer based on hydrophilic polymer is too high, the content of hydrophilic polymer in the composition decreases, and thus, rheological property suitable for coating cannot be exhibited.

(3) Antibacterial Agent Elution Test

The antibacterial film in which the coating layer was formed by the antibacterial coating composition of Example 1, and the antibacterial film in which the coating layer was formed by the antibacterial coating composition of Comparative Example 4 were respectively cut to 5 cm×5 cm, and then, bacterial growth inhibition rate was measured by the above method, and it was designated as initial bacterial growth inhibition rate ($T_0$). And then, each antibacterial film was put in an incubator (IB-05G, manufactured by Jeio tech. Co. Ltd.) in which conditions of 35° C. and relative humidity 90% were formed, and then, after 24 hours passed, it was taken out, and bacterial growth inhibition rate was measured by the same method, and it was designated as bacterial growth inhibition rate ($T_1$). On that basis, change in bacterial growth inhibition rate (%) was calculated according to the following Mathematical Formula 2, and the results were shown in the following Table 2.

Change in bacterial growth inhibition rate (%) = $\left(1 - \dfrac{T_1}{T_0}\right) \times 100$ [Mathematical Formula 2]

TABLE 2

| | | Example 1 | Comparative Example 4 |
|---|---|---|---|
| Hydrophilic polymer | Kind | PVA | PVA |
| | content[1] | 10 | 10 |
| Antibacterial polymer | Kind | PGA | LM-PGA |
| | content[2] | 2 | 2 |
| Solid content(wt %) | | 10.2 | 10.2 |
| Viscosity of composition (cP) | | 1,211 | 1,136 |
| Change in bacterial growth inhibition rate (%) | | 2.4 | 68.4 |

[1] wt % based on the total weight of composition
[2] parts by weight, based on 100 parts by weight of hydrophilic polymer PVA Referring to Table 2, it can be seen that compared to the antibacterial film in which the coating layer was formed by the antibacterial coating composition of Comparative Example 4, in the case of the antibacterial film in which the coating layer was formed by the antibacterial coating composition of Example 1, even under high temperature condition, leakage of antibacterial agent was small, and thus, the antibacterial property was not deteriorated. Specifically, change in bacterial growth inhibition rate calculated by the Mathematical Formula 2 was 30% or less, or 20% or less, or 10% or less, or 8% or less, or 6% or less, or 4% or less, or 3% or less, or 2.4% or less, and thus, it was confirmed that in case the antibacterial coating composition of Example 1 using high molecular weight antibacterial polymer comprising the repeat units represented by the Chemical Formula 1 over the specific number is used, unlike Comparative Example 4 using low molecular weight antibacterial polymer, even after time passes, antibacterial agent bleeding is prevented, thus enabling preparation of an antibacterial layer continuously exhibiting antibacterial property.

(4) Antifogging Effect Test

Each antibacterial polymer composition prepared in Example 1 and Example 4 was coated on a glass plate using a bar coater to a thickness of 100 μm, and then, dried at 80° C. for 240 minutes to prepare a glass plate coated with the antibacterial polymer composition on one side. Next, referring to ACS Appl. Mater. Interfaces 2020, 12, 10, 12305-12316, antifogging test was progressed. To sum up, water tank of which temperature was increased to 80° C. was prepared, and then, at the position of 5 cm over the water surface, a glass plate coated with the antibacterial polymer composition on one side was placed and maintained for 5 seconds, and it was observed whether or not antifogging performance was exhibited.

As the result, photographs comparing the antifogging test results of two glass plates respectively coated with the antibacterial polymer composition prepared in Example 1 and antibacterial polymer composition prepared in Example 4 were shown in FIG. 1.

Referring to FIG. 1, it can be confirmed that unlike the antibacterial polymer composition prepared in Example 1, in case the antibacterial polymer composition prepared in Example 4 was used, antifogging function was exhibited. It is judged that since PHMA-co-PGA prepared in Preparation Example 3, which is a copolymer used in Example 4, further comprises repeat units derived from N-hydroxymethylacrylamide, hydrophilicity of the composition may be increased, and thereby, the composition rapidly absorbed and diffused water molecules.

The invention claimed is:
1. An antibacterial polymer composition comprising
   a hydrophilic polymer; and
   an antibacterial polymer comprising repeat units represented by the following Chemical Formula 1,
   wherein the antibacterial polymer is included in a content of 1 part by weight or more and less than 50 parts by weight, based on 100 parts by weight of the hydrophilic polymer, and
   further comprising a solvent comprising water:

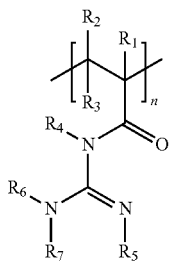

[Chemical Formula 1]

in the Chemical Formula 1,
   $R_1$ to $R_3$ are each independently, hydrogen or methyl,
   $R_4$ to $R_7$ are each independently, hydrogen, C1 to 10 alkyl, or C6 to 30 aryl, n is an integer of 10 to 10,000.
2. The antibacterial polymer composition according to claim 1,
   wherein the hydrophilic polymer is one or more selected from the group consisting of polyvinyl alcohol (PVA), polyethyleneglycol (PEG), polyvinylpyrrolidone (PVP) and carboxymethyl cellulose (CMC).
3. The antibacterial polymer composition according to claim 1, wherein the hydrophilic polymer is included in a content of 7 wt % to 20 wt %, based on the total weight of the antibacterial polymer composition.

4. The antibacterial polymer composition according to claim 1,
   wherein the repeat unit represented by the Chemical Formula 1 is represented by the following Chemical Formula 1-1:

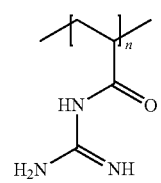

[Chemical Formula 1-1]

in the Chemical Formula 1-1,
   n is an integer of 10 to 10,000.
5. The antibacterial polymer composition according to claim 1,
   wherein the antibacterial polymer is a homopolymer comprising the repeat units represented by the Chemical Formula 1 only, a copolymer comprising the repeat units represented by the Chemical Formula 1 and repeat units derived from monomers having one or more ethylenically unsaturated groups, or a mixture thereof.
6. The antibacterial polymer composition according to claim 5,
   wherein the monomers having one or more ethylenically unsaturated groups are one or more selected from acrylic acid-based monomers, alkyl (meth)acrylate-based monomers, acrylamide-based monomers, halogenated vinyl monomers, vinyl alkylate-based monomers, alkenyl cyanide monomers, and aromatic vinyl-based monomers.
7. The antibacterial polymer composition according to claim 5,
   wherein the repeat units derived from monomers having one or more ethylenically unsaturated groups are represented by the following Chemical Formula 2 or 3:

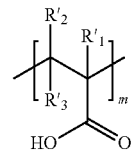

[Chemical Formula 2]

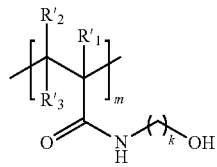

[Chemical Formula 3]

in the Chemical Formulas 2 and 3,
   $R'_1$ to $R'_3$ are each independently, hydrogen or methyl,
   k is an integer of 1 to 10, and
   m is an integer of 1 to 10,000.
8. The antibacterial polymer composition according to claim 7,
   wherein the repeat units derived from monomers having one or more ethylenically unsaturated groups are represented by the following Chemical Formula 2-1, Chemical Formula 3-1, or Chemical Formula 3-2:

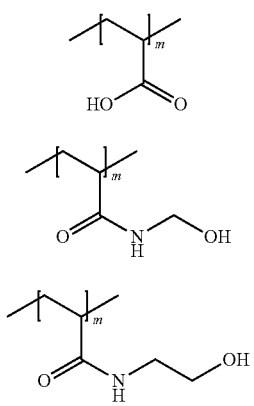

[Chemical Formula 2-1]

[Chemical Formula 3-1]

[Chemical Formula 3-2]

wherein in the Chemical Formula 2-1, Chemical Formula 3-1 and Chemical Formula 3-2, m is an integer of 1 to 10,000.

9. The antibacterial polymer composition according to claim 5,
wherein a mole ratio of the repeat units represented by the Chemical Formula 1 and the repeat units derived from monomers having one or more ethylenically unsaturated groups in the copolymer is 1:99 to 99:1.

10. The antibacterial polymer composition according to claim 1,
wherein the antibacterial polymer is a linear polymer.

11. The antibacterial polymer composition according to claim 1,
wherein the antibacterial polymer has a weight average molecular weight of 5,000 to 1,000,000 g/mol.

12. The antibacterial polymer composition according to claim 1,
wherein the solvent is water, or a mixture of water and ethanol.

13. The antibacterial polymer composition according to claim 1,
further comprising 1 to 10 parts by weight of glycerol, based on 100 parts by weight of the hydrophilic polymer.

14. The antibacterial polymer composition according to claim 1,
wherein the antibacterial polymer composition has a solid content of 10 to 20 wt %.

15. The antibacterial polymer composition according to claim 1,
wherein the antibacterial polymer composition has viscosity under constant temperature/constant humidity (23° C., 50% relative humidity), measured at 200 rpm in a V-75 spindle using Brookfield DV2T LV TJ0 equipment, of 1,000 cP to 20,000 cP.

16. The antibacterial polymer composition according to claim 1,
wherein the antibacterial polymer composition exhibits antibacterial property to Gram-negative bacteria.

17. An antibacterial product comprising
a substrates; and
a coating layer equipped on at least one side of the substrate,
wherein the coating layer is formed by the antibacterial polymer composition according to claim 1.

18. The antibacterial product according to claim 17,
wherein the coating layer can be separated from the substrate.

19. The antibacterial product according to claim 17,
wherein the antibacterial product is one or more selected from the group consisting of materials for maintaining freshness, fabric products, agricultural films, office supplies, packaging materials, and medical supplies.

* * * * *